(12) United States Patent
Lu

(10) Patent No.: US 10,438,025 B2
(45) Date of Patent: Oct. 8, 2019

(54) SELF-DESTRUCT SRAM-BASED AUTHENTICATION CIRCUIT

(71) Applicant: Taiwan Semiconductor Manufacturing Co., Ltd., Hsin-Chu (TW)

(72) Inventor: Shih-Lien Linus Lu, Hsinchu (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 249 days.

(21) Appl. No.: 15/284,876

(22) Filed: Oct. 4, 2016

(65) Prior Publication Data
US 2018/0096172 A1  Apr. 5, 2018

(51) Int. Cl.
| | |
|---|---|
| G06F 21/00 | (2013.01) |
| G06F 21/86 | (2013.01) |
| G11C 11/419 | (2006.01) |
| G06F 21/79 | (2013.01) |
| G11C 7/20 | (2006.01) |
| G11C 11/418 | (2006.01) |
| G11C 5/14 | (2006.01) |
| G11C 8/08 | (2006.01) |

(52) U.S. Cl.
CPC .............. *G06F 21/86* (2013.01); *G06F 21/79* (2013.01); *G11C 7/20* (2013.01); *G11C 11/418* (2013.01); *G11C 11/419* (2013.01); *G06F 2221/2143* (2013.01); *G11C 5/145* (2013.01); *G11C 8/08* (2013.01)

(58) Field of Classification Search
None
See application file for complete search history.

(56) References Cited

U.S. PATENT DOCUMENTS

| | | | |
|---|---|---|---|
| 8,605,523 B2 | 12/2013 | Tao et al. |
| 8,630,132 B2 | 1/2014 | Cheng et al. |
| 8,760,948 B2 | 6/2014 | Tao et al. |
| 8,908,421 B2 | 12/2014 | Liaw |
| 8,929,160 B2 | 1/2015 | Katoch et al. |
| 8,964,492 B2 | 2/2015 | Hsu et al. |
| 8,982,643 B2 | 3/2015 | Lum |
| 9,117,510 B2 | 8/2015 | Yang et al. |
| 9,208,858 B1 | 12/2015 | Lin et al. |
| 9,218,872 B1 | 12/2015 | Liaw |

(Continued)

OTHER PUBLICATIONS

Alimohammadi, Nima; Shokouhi, Shahriar B. Secure Hardware Key Based on Physically Unclonable Functions and Artificial Neural Network. 2016 8th International Symposium on Telecommunications (IST). https://ieeexplore.ieee.org/stamp/stamp.jsp?tp=&arnumber=7881924 (Year: 2016).*

(Continued)

*Primary Examiner* — Jeremiah L Avery
(74) *Attorney, Agent, or Firm* — Duane Morris LLP

(57) ABSTRACT

A memory device is disclosed. The memory device includes a memory bit array comprising a plurality of memory bits, wherein each memory bit is configured to present an initial logic state when the memory device is powered on, and an erasion circuit, coupled to the memory bit array, and configured to alter an intrinsic characteristic of at least one of the memory bits so as to alter the initial logic state of the at least one memory bit.

17 Claims, 6 Drawing Sheets

(56) References Cited

U.S. PATENT DOCUMENTS

| | | | | |
|---|---|---|---|---|
| 2003/0142550 A1* | 7/2003 | Kawahara | ......... | H01L 21/28273 365/185.28 |
| 2005/0128807 A1* | 6/2005 | Chen | ......... | G11C 8/08 365/185.17 |
| 2006/0023486 A1* | 2/2006 | Furusawa | ......... | G06F 21/79 365/145 |
| 2006/0268641 A1* | 11/2006 | Harris | ......... | G11C 17/14 365/207 |
| 2009/0119447 A1* | 5/2009 | Lee | ......... | G11C 11/5635 711/103 |
| 2010/0027337 A1* | 2/2010 | Park | ......... | G11C 5/147 365/185.11 |
| 2013/0141137 A1* | 6/2013 | Krutzik | ......... | H03K 19/173 326/8 |
| 2013/0339733 A1* | 12/2013 | Nagai | ......... | H04L 9/3234 713/168 |
| 2013/0339756 A1* | 12/2013 | Nagai | ......... | H04L 9/0816 713/193 |
| 2014/0153345 A1 | 6/2014 | Kim et al. | | |
| 2014/0233330 A1 | 8/2014 | Ko et al. | | |
| 2015/0220457 A1* | 8/2015 | Katoh | ......... | G09C 1/00 713/193 |
| 2015/0348598 A1 | 12/2015 | Wang et al. | | |
| 2015/0371702 A1 | 12/2015 | Wu et al. | | |
| 2015/0380077 A1 | 12/2015 | Wu et al. | | |
| 2015/0380078 A1 | 12/2015 | Liaw | | |
| 2016/0307624 A1* | 10/2016 | Liu | ......... | G11C 16/10 |

OTHER PUBLICATIONS

Kim, Moon-Seok et al. Investigation of Physically Unclonable Functions Using Flash Memory for Integrated Circuit Authentication. IEEE Transactions on Nanotechnology, vol. 14, Issue: 2. https://ieeexplore.ieee.org/stamp/stamp.jsp?tp=&arnumber=7029131 (Year: 2015).*

Forte, Domenic; Srivastava, Ankur. Manipulating Manufacturing Variations for Better Silicon-Based Physically Unclonable Functions. 2012 IEEE Computer Society Annual Symposium on VLSI. https://ieeexplore.ieee.org/stamp/stamp.jsp?tp=&arnumber=6296468 (Year: 2012).*

* cited by examiner

SELF-DESTRUCT SRAM-BASED AUTHENTICATION CIRCUIT

BACKGROUND

With the increasing use of integrated circuits in electronic devices that provide different types of information for a variety of different applications, there has been an increasing need to adequately protect sensitive and/or critical information that may be stored within an electronic device to limit access to such information to only other devices that have permission to access the information. Some examples of applications include the authentication of devices, protection of confidential information within a device, and securing a communication between two or more devices.

A physically unclonable function (PUF) is a physical structure generally within an integrated circuit that provides a number of corresponding outputs (e.g., responses) in response to inputs (e.g., challenges/requests) to the PUF. Each PUF provides one or more sets of request-response pairs. An identity of the integrated circuit may be established by such request-response pairs provided by the PUF. With the establishment of the identity, secure communication can be provided between devices. The PUF can also be used for existing authentication purposes to replace the current method of assigning an identity to an electronic device. Since the PUF is based on intrinsic properties of a manufacturing process, the PUF has various advantages over conventional authentication approaches that inscribe an identity on a device that may be mimicked and/or reverse engineered more easily.

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

DETAILED DESCRIPTION OF EXEMPLARY EMBODIMENTS

Figure 1:
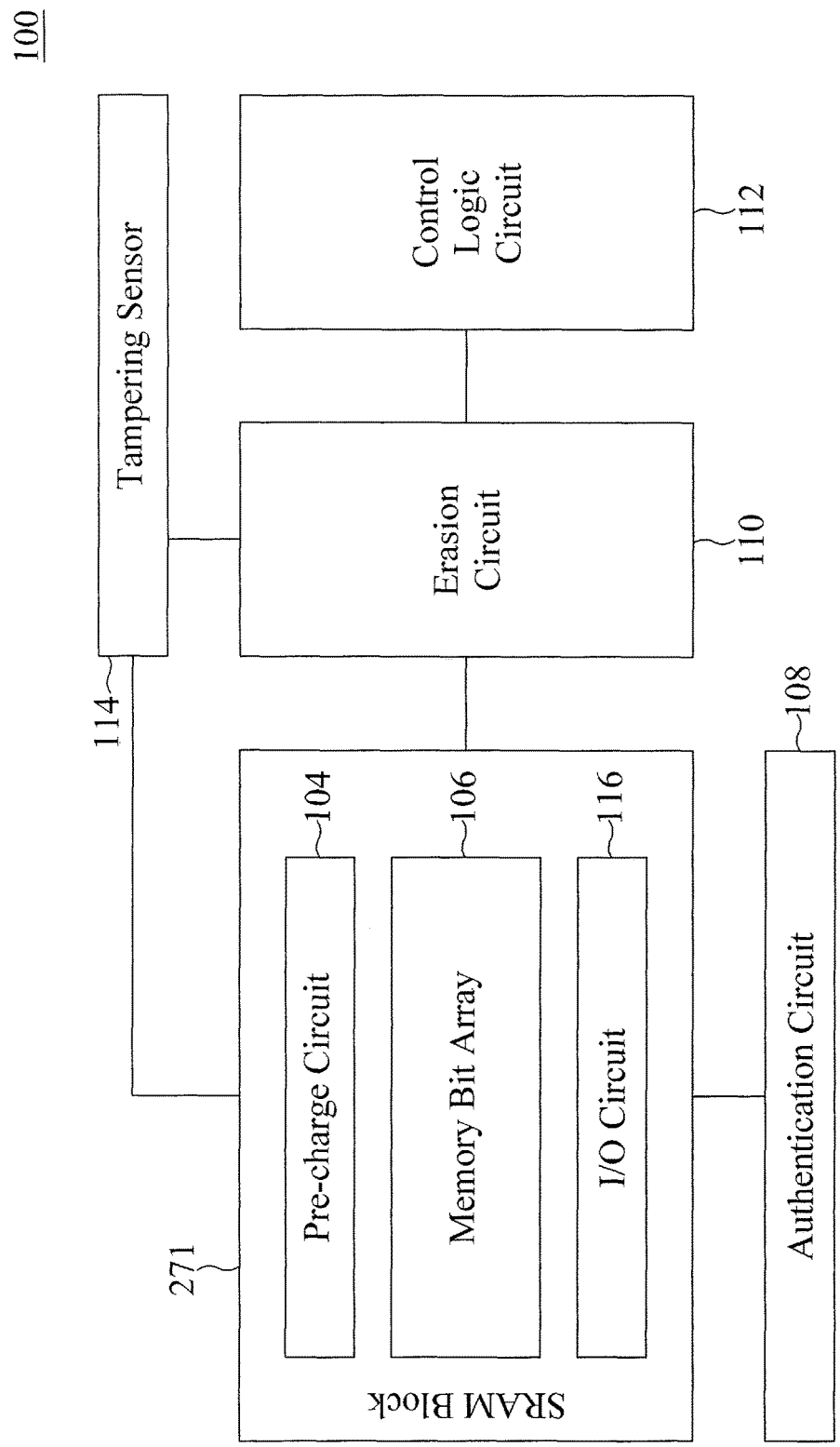
FIG. 1 illustrates an exemplary block diagram of a memory device that includes an erasion circuit coupled to a static random access memory (SRAM) block, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A physical unclonable function (PUF) is generally used for authentication and secret key storage without requiring secure electrically erasable programmable read-only memory (EEPROMs) (or any of other non-volatile memory) and/or other expensive hardware (e.g., battery-backed static random-access memory). Instead of storing secrets in a digital memory, the PUF derives a secret from physical characteristics of an integrated circuit (IC). The PUF is based on an idea that even though an identical manufacturing process is used to fabricate a plurality of ICs, each IC may be slightly different due to manufacturing variability. PUFs leverage this variability to derive "secret" information that is unique to each of the ICs (e.g., a silicon "biometric"). Generally, such secret information is referred to as a "signature" of the IC. In addition, due to the manufacturing variability that defines the signature, one cannot manufacture two identical ICs even with full knowledge of the IC's design. Various types of variability of an IC can be used to define such a signature such as, for example, gate delay(s), power-on state(s) of a static random-access memory (SRAM) device, and/or any of a variety of physical characteristics of an IC.

In the example of using the power-on state(s) of a static random-access memory (SRAM) device provided above, even though an SRAM device includes symmetric cells (bits), manufacturing variability may still cause each bit of the SRAM device to tend to be at a high state (i.e., a logical "1") or at a low state (i.e., a logical "0") when the SRAM device is powered on. Such initial power-on states of the bits are randomly distributed across the whole SRAM device, which gives rises to a variability that can be defined by a PUF to produce a unique signature of the SRAM device. Generally, generating a PUF signature by using the power-on state(s) of an SRAM device is referred to as a "power-on SRAM-based PUF." Although the initial power-on states of the bits are randomly distributed, some tampering techniques exist to duplicate and/or determine the randomly distributed initial power-on states such as, for example, using a micro-probing device, a delay circuit, etc. Such tampering techniques may in turn compromise a reliability of the generated PUF signature. Therefore, the existing power-on SRAM-based PUF has not been entirely satisfactory in every aspect.

Embodiments of the present disclosure provide various systems and methods to alter one or more bits of a PUF signature for a memory device by using an erasion circuit coupled to the memory device. More specifically, the erasion circuit in the disclosed systems and methods alters at least one intrinsic characteristic (e.g., a threshold voltage) of each bit of the memory device thereby altering the initial power-on states of the bits of the memory device. Accordingly, the PUF signature generated based on the initial power-on states of the bits prior to the alteration may no longer exist (i.e., it is "erased") and, in some embodiments, a new PUF signature may be generated based on the initial power-on states of the bits subsequently to the alteration. Further, in some embodiments, such an alteration process, performed by the erasion circuit, may occur upon a tampering process being detected, and the detection may be performed by a tampering sensor coupled to the erasion circuit. As such, the erasion circuit may advantageously prevent a PUF signature generated based on initial power-on states from being compromised (e.g., mimicked).

FIG. 1 illustrates an exemplary block diagram of a memory device 100 in accordance with various embodiments. In the illustrated embodiment of FIG. 1, the memory device 100 includes a memory block 102, an authentication circuit 108, an erasion circuit 110, a control logic circuit 112, and a tampering sensor 114. More specifically, the authentication circuit 108 is coupled to the memory block 102, and the erasion circuit 110 is coupled between the memory block 102 and the control logic circuit 112. As such, the control logic circuit 112 may be configured to control the erasion circuit 110 and/or the memory block 102, which will be described in further detail below. Still more specifically, the erasion circuit 110 is further coupled to the tampering sensor 114 that is also coupled to the memory block 102. Although, in the illustrated embodiment of FIG. 1, each component is shown as a separate block for the purpose of clear illustration, in some other embodiments, some or all of the components shown in FIG. 1 may be integrated together. For example, the memory block 102 may include an embedded authentication circuit (e.g., 108).

More specifically in the memory block 102 of FIG. 1, the memory block 102 may be a static random access memory (SRAM) block that includes a pre-charge circuit 104, a memory bit array 106, and a input/output (I/O) circuit 116. The pre-charge circuit 104 is coupled to the memory bit array 106, and the I/O circuit 116 is coupled to the memory bit array 106. Although the illustrated embodiment of FIG. 1 provides an SRAM block, any of a variety of memory blocks (e.g., an RRAM block, a DRAM block, an MRAM block, etc.) may be implemented as the memory block 102 while remaining within the scope of the present disclosure.

In some embodiments, the memory bit array 106 includes a plurality of bits (or cells) that are arranged in a column-row configuration, wherein each bit is arranged at an intersection of a corresponding column and a corresponding row. Each bit is configured to present a data state (either a logical 1 or a logical 0) when the SRAM block 102 is powered on. Such a data state for a bit is referred to as the initial power-on state for that bit (hereinafter "initial state"). Moreover, the memory bit array 106 includes a plurality of bit lines (BL's) and/or bit bar lines (BBL's) arranged along columns, and a plurality of word lines (WL's) along rows, which will be described in further detail with respect to FIG. 2A.

The pre-charge circuit 104 is configured to pre-charge the BL's and/or BBL's of the memory bit array 106 based on a pre-charge signal provided by the control logic circuit 112 or a blown pre-charge signal provided by the erasion circuit 110, which will be discussed in further detail below. In some alternative embodiments, the pre-charge circuit 104 may be configured to "pre-discharge" the BL's and/or BBL's of the memory bit array 106. In the following discussion, the pre-charge circuit 104 is directed to pre-charging the BL's and/or BBL's of the memory bit array 106. The I/O circuit 116 is configured to access (read and/or write) data states stored in the bits of the memory bit array 106, which will be discussed in further detail with respect to FIGS. 2A-2B.

In some embodiments, the authentication circuit 108 is configured to generate a PUF signature based on the initial states or altered initial states of the bits of the memory bit array 106, which will be discussed in further detail with respect to FIGS. 2A-2B.

Referring still to FIG. 1, in some embodiments, the tampering sensor 114 (e.g., a light sensor) is configured to monitor/detect whether an intrusive technique is used to duplicate the initial states of the bits of the memory bit array 106 (hereinafter a "tampering action"), as described above. A typical tempering sensor consists of at least a sensor, a switch and a signal source. A sensor can be (but not restricted to) a light sensor, a motion sensor or a sound sensor or a force sensor. When the sensor detects an event (in the case of light sensor, light wave is detected), the sensor triggers the switch to turn on the switch, which in turn causes the signal source to provide an alert signal. In some embodiments, the tampering sensor 114 is configured to provide a tampered signal (similar to the above-mentioned alert signal) to the erasion circuit 110 based on whether a tampering action is detected. In some embodiments, when the erasion circuit 110 is not notified by the tampering sensor 114 of a tampering action (e.g., the tampered signal at a low logic state), the erasion circuit 110 is configured to receive a pre-charge control signal and a word line (WL) control signal from the control logic circuit 112, and use the pre-charge control signal and WL control signal to control the pre-charge circuit 104 and the memory bit array 106 of the SRAM block 102, respectively. On the other hand, when the erasion circuit 110 is notified by the tampering sensor 114 of a tampering action (e.g., the tampered signal at a high state), the erasion circuit 110 may decouple the pre-charge control signal and the WL control signal received from the control logic circuit 112 and further provide the above-mentioned blown pre-charge signal and a blown WL signal to the pre-charge circuit 104 and the memory bit array 106 of the SRAM block 102, respectively, so as to perform an erasion process on, at least, one of the bits of the memory bit array 106 of the SRAM block 102. Details of the blown pre-charge signal, the blown WL signal, and the erasion process will be provided below with respect to FIGS. 2A-2B, and 3A-3B.

Figure 2A:
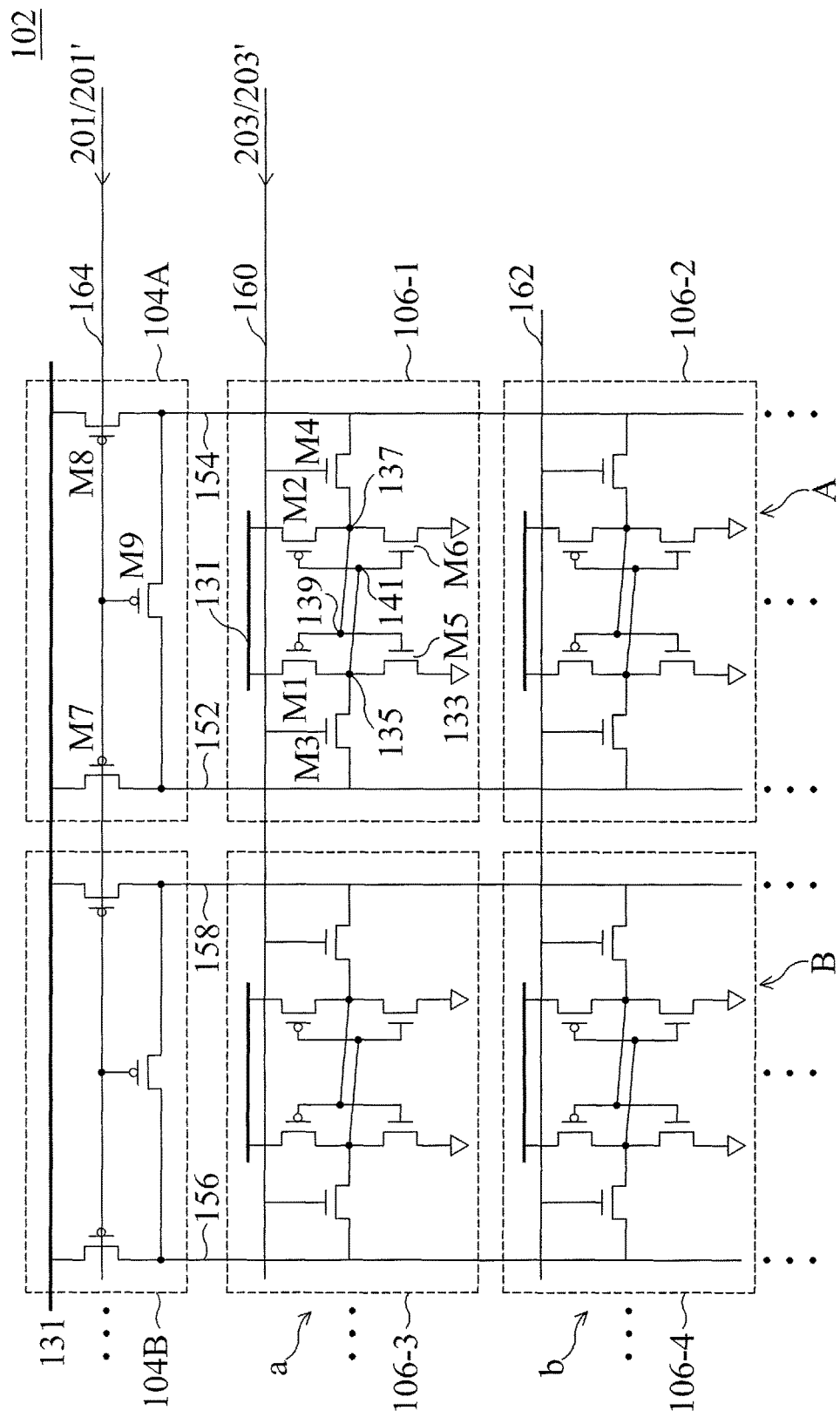
FIG. 2A illustrates an exemplary circuit diagram of a portion of the SRAM block of FIG. 1, in accordance with some embodiments.
Figure 2B:
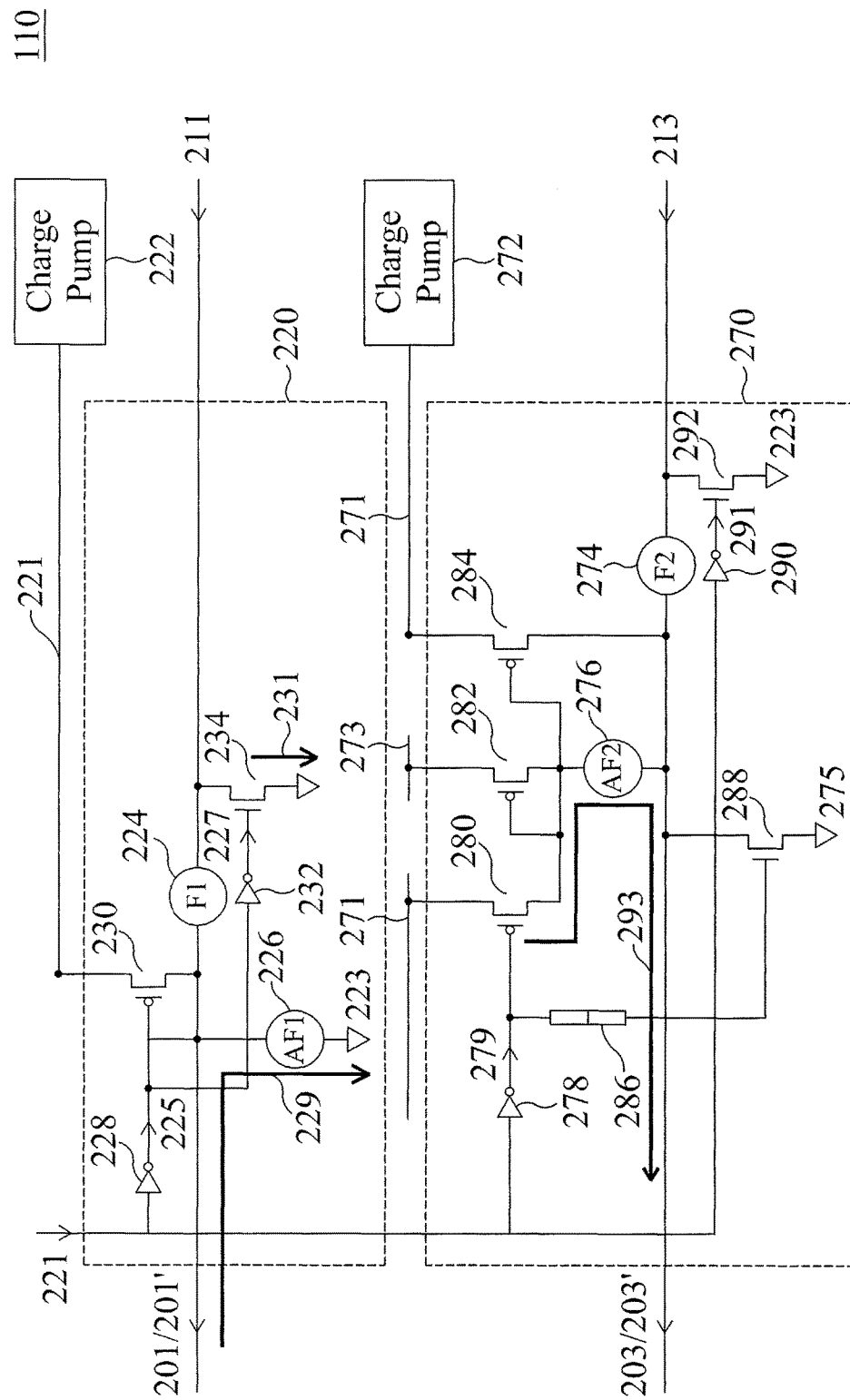
FIG. 2B illustrates an exemplary schematic circuit diagram of a portion of the erasion circuit of FIG. 1, in accordance with some embodiments.

Referring now to FIGS. 2A and 2B, an exemplary schematic circuit diagram of a portion of the SRAM block 102 and an exemplary schematic circuit diagram of a portion of the erasion circuit 110 are illustrated, respectively.

As described above, the bits of the memory bit array 106 are arranged in a column-row configuration in which each column has a BL and a BBL and each row has a WL. More specifically, the BL and BBL of each column are respectively coupled to a plurality of bits that are disposed in that column, and each memory cell in that column is arranged on a different row and coupled to a respective (different) WL. That is, each bit of the memory bit array 106 is coupled to a BL of a column of the memory cell array 106, a BBL of the column of the memory bit array 106, and a WL of a row of the memory bit array 106. In some embodiments, the BL's and BBL's are arranged in parallel vertically and the WL's are arranged in parallel horizontally (i.e., perpendicular to the BL's and BBL's).

Figure 4:
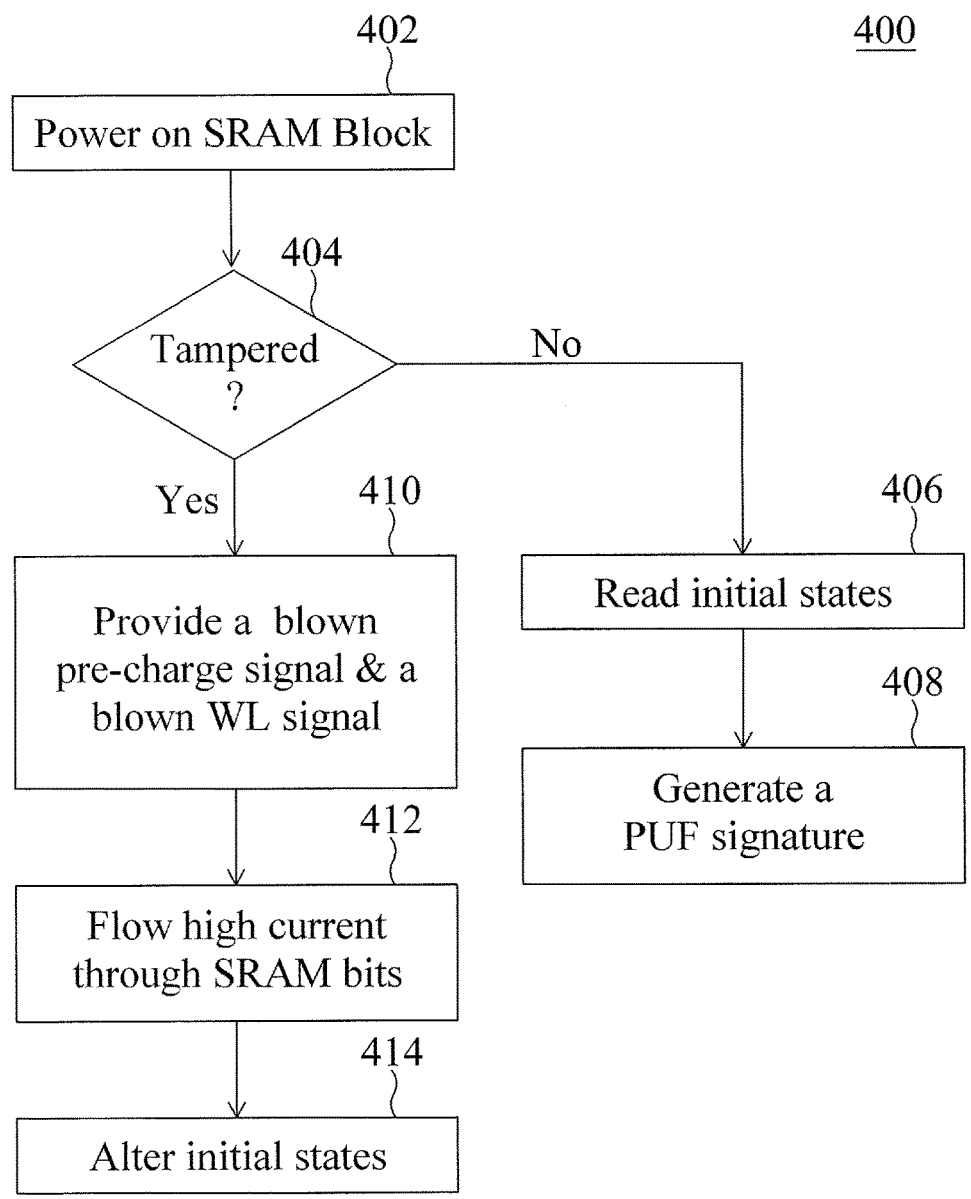
FIG. 4 illustrates a flow chart of a method to perform an erasion process on a PUF signature generated by the memory device of FIG. 1, in accordance with some embodiments.

In the illustrated embodiment of FIG. 2A, 4 bits (e.g., 106-1, 106-2, 106-3, and 106-4) are shown in the memory bit array 106. Based on the above description, columns "A," and "B," and rows "a," "b" are accordingly shown in the memory bit array 106 of FIG. 2A. More specifically, the bits 106-1 and 106-2 are arranged along column A, the bits 106-3 and 106-4 are arranged along column B, the bits 106-1 and 106-3 are arranged along row a, and the bits 106-2 and 106-4 are arranged along row b. Column A has BL 152 and BBL 154 that are coupled to the bits 106-1 and 106-2; column B has BL 156 and BBL 158 that are coupled to the bits 106-3 and 106-4; row a has WL 160 that are coupled to the bits 106-1 and 106-3; and row b has WL 162 that are coupled to the bits 106-2 and 106-4. Although the illustrated embodiment of FIG. 2 shows only 4 bits, any desired number of bits may be included in the embodiment of the memory bit array 106 while remaining within the scope of the present disclosure. As such, the number of columns and rows can be adjusted in accordance with the number of bits in the memory bit array 106.

In some embodiments, the pre-charge circuit 104 includes a plurality of pre-charge units (e.g., 104A, and 104B) and each pre-charge unit is coupled to a column of the memory bit array 106. For example, as illustrated in FIG. 2A, the pre-charge unit 104A is coupled to column A; the pre-charge unit 104B is coupled to column B. As such, the number of the pre-charge units is equal to a number of columns of the memory bit array 106, in accordance with some embodiments.

In the embodiment of FIG. 2A, each pre-charge unit is coupled to its corresponding column through the BL and BBL that belong to that column, and further coupled to the bits along that column through the BL and BBL. For example, as shown in FIG. 2A, the pre-charge unit 104A is coupled to column A and the bits 106-1 and 106-2 (along column A) through the BL 152 and BBL 154; and the pre-charge unit 104B is coupled to column B and the bits 106-3 and 106-4 (along column B) through the BL 156 and BBL 158.

In the illustrated embodiment of FIG. 2A, the pre-charge units 104A and 104B each includes 3 transistors that are coupled to one another, and the bits 106-1, 106-2, 106-3, and 106-4 are each implemented as a 6-transistor SRAM (6T-SRAM) bit (hereinafter "SRAM bit"). Although the SRAM bits are each implemented as a 6T-SRAM bit, the SRAM bit (e.g., 106-1, 106-2, 106-3, 106-4, etc.) of the memory bit array 106 is not limited to being implemented as a 6T-SRAM bit. The SRAM bit of the memory bit array 106 may be implemented as any of a variety of SRAM bits such as, for example, 2T-2R SRAM bit, 4T-SRAM bit, 8T-SRAM bit, etc.

Referring still to FIG. 2A, since each of the pre-charge units is substantially similar to one another, for brevity, only the operation of the pre-charge unit 104A is described below. Similarly, since each of the SRAM bits in the memory bit array 106 is substantially similar to one another, for brevity, only the operation of the SRAM bit 106-1 is described below.

As shown in FIG. 2A, the SRAM bit 106-1 includes 6 transistors: M1, M2, M3, M4, M5, and M6. The transistor M1 and M5 are formed as a first inverter and the transistors M2 and M6 are formed as a second inverter wherein the first and second inverters are coupled to each other, as shown. More specifically, the first and second inverters are each coupled between first voltage reference 131 and second voltage reference 133. Generally, the first voltage reference 131 is a voltage level of a supply voltage applied on the SRAM bits of the memory bit array 106. The first voltage reference 131 is typically referred to as "Vdd." The second voltage reference 133 is typically referred to as "ground." Further, the first inverter is coupled to the transistor M3, and the second inverter is coupled to the transistor M4. In addition to being coupled to the inverters, the transistors M3 and M4 are both coupled to the WL 160 and each coupled to the BL 152 and BBL 154, respectively. Typically, the transistors M1 and M2 are referred to as pull-up transistors of the SRAM bit 106-1; the transistors M5 and M6 are referred to as pull-down transistors of the SRAM bit 106-1; the transistors M3 and M4 are referred to as access transistors of the SRAM bit 106-1. In some embodiments, the transistors M3, M4, M5, and M6 each includes an NMOS transistor, and M1 and M2 each includes a PMOS transistor. Although the illustrated embodiments of FIG. 2A shows that M1-M6 are either NMOS or PMOS transistors, any of a variety of transistors or devices that are suitable for use in a memory device may be used such as, for example, a bipolar junction transistor (BJT), a high-electron mobility transistor (HEMT), etc.

Continuing with the discussion of the transistors of the SRAM bit 106-1, in some embodiments, transistors M3 and M4 each has a gate that is coupled to the WL 160, as shown in FIG. 2A. The gates of transistors M3 and M4 are configured to receive a WL signal 203 or a blown WL signal 203', through the WL 160, which will be discussed in further detail below. Transistors M3 and M5 are coupled to each other at node 135, which is also coupled to a drain of transistor M1 and node 141, respectively. Transistors M4 and M6 are coupled to each other at node 137, which is also coupled to a drain of transistor M2 and node 139, respectively.

In general, when an SRAM bit stores a data bit (e.g., an initial state), a first node of the SRAM bit is configured to be at a first logical state (either a logical 1 or a logical 0), and a second node of the SRAM bit is configured to be at a second logical state (either a logical 0 or a logical 1), wherein the first and second logical states are complementary with each other. In some embodiments, the first logical state at the first node is the data bit stored by the SRAM bit. For example, in the illustrated embodiment of FIG. 2A, when the SRAM bit 106-1 presents an initial state that is at a logical 1, the node 135 is configured to be at the logical 1 state, and the node 137 is configured to be at the logical 0 state.

Referring now to the pre-charge unit 104A of FIG. 2A, the pre-charge unit 104A includes 3 transistors: M7, M8, and M9. As shown, transistor M7 is coupled between the supply voltage that provides the voltage reference 131 and the BL 152; transistor M8 is coupled between the supply voltage that provides the voltage reference 131 and the BBL 154; transistor M9 is coupled between the BL 152 and BBL 154. More specifically, each of the transistors M7, M8, and M9 has a gate, and the (three) gates of the transistors M7, M8, and M9 are commonly coupled to a pre-charge signal line 164. In some specific embodiments, the three gates are configured to receive a pre-charge signal 201 or a blown pre-charge signal 201', through the pre-charge signal line 164, which will be discussed in further detail below.

Referring now to FIG. 2B, a portion of the schematic circuit diagram of the erasion circuit 110 is illustrated, in accordance with various embodiments. The portion of the erasion circuit 110 includes only a first pair of a first sub-circuit 220 and a second sub-circuit 270. Despite not being shown, the erasion circuit 110 may include a plurality of pairs of the first and second sub-circuits. In some embodiments, the first sub-circuit 220 is configured to receive a pre-charge control signal 211 from the control logic 112, and based on a state (e.g., a high or a low logic state) of the tampered signal 221 provided by the tampering sensor 114, to selectively provide either the pre-charge signal 201 or the blown pre-charge signal 201' to the pre-charge circuit 104 (e.g., pre-charge units 104A, 104B, etc.); the second sub-circuit 270 is configured to receive a WL control signal 211 from the control logic 112, and also based on a state (e.g., a high or a low logic state) of the tampered signal 221, to selectively provide either the WL signal 203 or the blown WL signal 203' to the coupled WL of the memory bit array 106 (e.g., 160). In some embodiments, the pre-charge signal 201 may be equivalent to the pre-charge control signal 211; the WL signal 203 may be equivalent to the WL control signal 213.

In some embodiments, each row of the memory bit array 106 (FIG. 2A) is coupled to a corresponding pair of the first and second sub-circuits (e.g., 220 and 270) of the erasion circuit 110. For example, in the illustrated embodiments of FIGS. 2A and 2B, the pre-charge units of the pre-charge circuit 104 and the SRAM bits along row a (e.g., 106-1, 106-3, etc.) are coupled to the first sub-circuit 220 and second sub-circuit 270 (i.e., the first pair), respectively, while the pre-charge units of the pre-charge circuit 104 and the SRAM bits along row b (e.g., 106-2, 106-4, etc.) may be coupled to a second pair of the first and second sub-circuits (not shown in FIG. 2B). Since the first and second sub-circuits of the second pair are substantially similar to the first and second sub-circuits of the first pair, i.e., 220 and 270, respectively, only the operations of the first and second sub-circuits (220 and 270) of the first pair will be discussed below.

Referring now to the first sub-circuit 220 of FIG. 2B, the first sub-circuit 220 is coupled to a charge pump 222 that is configured to provide a voltage reference 221 to the first sub-circuit 220. In some embodiments, the voltage reference 221 may be substantially higher than the voltage reference 131 (FIG. 2A). Such a high voltage level (of the voltage reference 221) is configured to be used for (electrically programming) a fuse and/or an anti-fuse device, as described below.

More specifically, in the first sub-circuit 220, as illustrated, the first sub-circuit 220 includes a first fuse device 224, a first anti-fuse device 226, inverters 228 and 232, a PMOS transistor 230, and an NMOS transistor 234. As illustrated in FIG. 2B, the inverter 228 is coupled between a signal line configured to receive the tampered signal 221 and (a gate of) the PMOS transistor 230; the PMOS transistor 230 is coupled between the voltage reference 221 and the first fuse device 224 (and also the first anti-fuse device 226); the first fuse device 224 is coupled between a signal line configured to receive the pre-charge control signal 211 and another signal line configured to transmit the pre-charge signal 201 and the blown pre-charge signal 201'; the first anti-fuse device 226 is coupled between voltage reference 223 (e.g., ground) and the signal line configured to transmit the pre-charge signal 201 and the blown pre-charge signal 201'. The operation of the first sub-circuit 220 will be discussed in further detail below.

The second sub-circuit 270 is coupled to a charge pump 272 that is configured to provide a voltage reference 271 to the second sub-circuit 270. The second sub-circuit 270 may be coupled to another voltage reference 273. In some embodiments, the charge pump 272 may be substantially similar to the charge pump 222, the voltage reference 271 may be substantially similar to the voltage reference 221 (i.e., a high voltage level), and the voltage reference 273 may be substantially similar to the voltage reference 131 (FIG. 2A). Thus, the voltage reference 221 and 271 may be herein referred to as "High Vdd," and the voltage reference 273 and 131 may be herein referred to as "Vdd."

More specifically, the second sub-circuit 270 includes a second fuse device 274, a second anti-fuse device 276, inverters 278 and 290, PMOS transistors 280, 282, and 284, NMOS transistors 288 and 290, and a delay circuit 286. As illustrated in FIG. 2B, the inverter 278 is coupled between the signal line configured to receive the tampered signal 221 and (a gate of) the PMOS transistor 280; the PMOS transistor 280 is coupled between High Vdd (271) and the second anti-fuse device 276 (and also gates of the PMOS transistors 282 and 284); the PMOS transistor 282 is coupled between Vdd (273) and the anti-fuse device 276; the anti-fuse device 276 is further coupled to a signal line configured to transmit the WL signal 203 and the blown WL signal 203'; the PMOS transistor 284 is coupled between High Vdd (271) and the second fuse device 274; the second fuse device 274 is further configured to a signal line configured to receive the WL control signal 213. The operation of the second sub-circuit 270 will be discussed in further detail below.

According to some embodiments, in general, a fuse device (e.g., 224 and 274) is a type of resistor that starts with a low resistance and abruptly increases its resistance when it is electrically programmed. The fuse device is configured to blow itself when a high current flows through the fuse device or a high voltage is applied to the fuse device (i.e., when it is electrically programmed). As such, the fuse device provides a "disconnected" conduction path to its coupled device/signal line in response to being blown by a high current and/or a high voltage. Conversely, an anti-fuse device (e.g., 226 and 276) is a type of resistor that starts with a high resistance and abruptly decreases its resistance when it is electrically programmed. Thus, the anti-fuse device may be configured to provide a "connected" conduction path to its coupled device/signal line in response to being blown by a high current and/or a high voltage (i.e., when it electrically programmed). Typically, a high voltage used to program the fuse and anti-fuse devices, as discussed above, is referred to as an electrical programming voltage.

The following discussion is directed to providing an erasion process, by the first pair of the erasion circuit 110 (i.e., first and second sub-circuits 220 and 270), on the initial state of the SRAM bit 106-1. It is understood that the same erasion process performed on the SRAM bit 106-1 can be used for all other SRAM bits along row a (e.g., SRAM bit 106-3, etc.). As described above, each row is coupled with a corresponding pair of first and second sub-circuits, and thus, the following discussion of the erasion process on the SRAM bit 106-1 is also applicable to other bits (e.g., SRAM bits 106-2, 106-4, etc.) along any of other rows (e.g., row b, etc.) of the memory bit array 106 being erased by the respective pair of first and second sub-circuits.

As described above, when the SRAM block 102 is powered on, each of the SRAM bits presents an initial state. Such an initial state is present at each SRAM bit based on the intrinsic characteristic(s) of the SRAM bit and thus can be used by the authentication circuit 108 to generate a PUF signature. To generate the PUF signature, the initial states of the SRAM bits are read out by the I/O circuit 116, and the authentication circuit 108 retrieves the initial states from the I/O circuit 116. More specifically, the control logic 112 provides the pre-charge control signal 211, through the erasion circuit 110 (the first sub-circuit 220), to the pre-charge circuit 104 (the pre-charge units 104A, 104B, etc.) so as to pre-charge the BL's and BBL's (e.g., 152, 154, 156, 158, etc.) of the bit array 106. As such, the pre-charge signal 201 received by the pre-charge units (104A, 104B, etc.) may be substantially identical to the pre-charge control signal 211. Prior to, simultaneously with, or subsequently to pre-charging the BL's and BBL's, the control logic 112 provides the WL control signal 213, through the erasion circuit 110 (the second sub-circuit 270), to the SRAM bit 106-1 (and other SRAM bits along row a, for example, 106-3) so as to assert the WL 160. As such, the WL signal 203 received by the SRAM bit 106-1 may be substantially identical to the WL control signal 213. Once the WL 160 is asserted, the access transistors M3 and M4 are turned on, and accordingly the initial state present at the node 135 and the complementary initial state present at the node 137 can be read out through the BL 152 and BBL 154, respectively, by the I/O circuit 116.

In some embodiments, when a presence of a tampering action is detected by the tampering sensor 114, the first sub-circuit 220 may cause the pre-charge control signal 211 to become the blown pre-charge control signal 201' and the second sub-circuit 270 may cause the WL control signal 213 to become the blown WL signal 203' so as to cause high currents to flow through transistors M3 and M5, and transistors M4 and M6, respectively. In some embodiments, such high current may change one or more intrinsic characteristics (e.g., a threshold voltage) of the transistors (e.g., M3, M4, M5, and M6) of the SRAM bit 106-1. Accordingly, the initial state and/or the complementary initial state that was previously stored in the SRAM bit 106-1 may be "erased" or "altered". Thus, the PUF signature generated based on the initial states of the SRAM bits can no longer be duplicated or mimicked. Details of the blown pre-charge signal 201' and the blown WL signal 203' are described below.

Referring back to the sub-circuit 220 of FIG. 2B, when a presence of a tampering action is detected by the tampering sensor 114, in some embodiments, the tampered signal 221 may transition from a low logic state to a high logic state. When the tampered signal 221 is at the high logic state, the inverter 228 provides a signal 225 at a low state to the PMOS transistor 230 and the inverter 232. The inverter 232 then provides a signal 227 at a high logic state to the NMOS transistor 234. Accordingly, the PMOS transistor 230 and the NMOS transistor 234 are turned on. Since the PMOS transistor 230 is turned on, the High Vdd (221) is coupled (applied) to the fuse device 224 and the anti-fuse device 226, respectively. As described above, when a high voltage is applied to a fuse device and an anti-fuse device, the fuse device is electrically programmed to be disconnected and the anti-fuse device is electrically programmed to be connected, respectively. Referring back to FIG. 2B, upon receiving the High Vdd, the fuse device 224 is disconnected (i.e., providing an open conduction path) and the anti-fuse device 226 is connected (i.e., providing a short conduction path). As such, two conduction (discharging) paths 229 and 231 are provided. By provision of the discharging path 231, the pre-charge control signal 211 is pulled down to ground through the discharging path 231. And, by provision of the discharging path 229, equivalently, the blown pre-charge signal 201' at a low state may be applied to the gates of the transistors M7, M8, and M9 of the pre-charge unit 104A, which turns on the transistors M7, M8, and M9 regardless of whether the pre-charge control signal 211 is at a high logic state or a low logic state. In other words, even though the pre-charge control signal 211 is at the high logic state, through electrically programming the fuse device 224 and the anti-fuse device 226, the pre-charge control signal 211 is altered to become the blown pre-charge signal 201' (i.e., always at the low state).

Referring now to the second sub-circuit 270 of FIG. 2B, when the tampered signal 221 is at the high logic state, the inverter 278 provides a signal 279 at a low state to the PMOS transistor 280 so as to turn on the PMOS transistor 280, and the inverter 290 provides a signal 291 at a low state to the NMOS transistor 292 so as to turn off the NMOS transistor 292. More specifically, since the PMOS transistor 280 is turned on, the High Vdd (271) is coupled through the PMOS transistor 280 to the gate of the PMOS transistor 282, to the gate of the PMOS transistor 284, and to the anti-fuse device

276. As such, the PMOS transistor 282 is turned off (under a diode mode), the PMOS transistor 284 is turned on so as to allow the High Vdd (271) to be coupled to the fuse device 274, and the anti-fuse device 276 is electrically programmed to be connected. In some embodiments, through the delay circuit 286, the anti-fuse device 276 is electrically programmed before the High Vdd is coupled to the fuse device 274. In other words, the fuse device 274 is electrically programmed after the anti-fuse device 276 is electrically programmed. Consequently, a conduction path 293 is provided. In general, the WL control signal 213 may be at a voltage level of about Vdd, which is substantially lower than the High Vdd. By provision of the conduction path 293, the WL blown signal 203' may be provided to the WL 160 (FIG. 2A) at a high logic state and at a voltage level that is substantially higher than Vdd (i.e., High Vdd). Thus, regardless of the voltage level of the WL control signal 213, the blown WL signal 203' is altered to be at the voltage level of the High Vdd. In some alternative embodiments, the voltage level of the blown WL signal 203' may be substantially similar to the voltage level of Vdd. Referring back to FIG. 2A, upon receiving the blown pre-charge signal 201' and the blown WL signal 203', the transistors M7, M8, and M9 of the pre-charge unit 104A are turned on to pre-charge the BL 152 and BBL 154, and the access transistors M3 and M4 of the SRAM bit 106-1 are turned on so as to assure the pull-down transistors M5 and M6 to operate under a diode mode, respectively. When the pull-down transistors M5 and M6 operate under the diode mode, high currents (e.g., saturation currents of the transistors M5 and M6) are flown through the transistors M5 and M6, respectively.

Figure 3A:
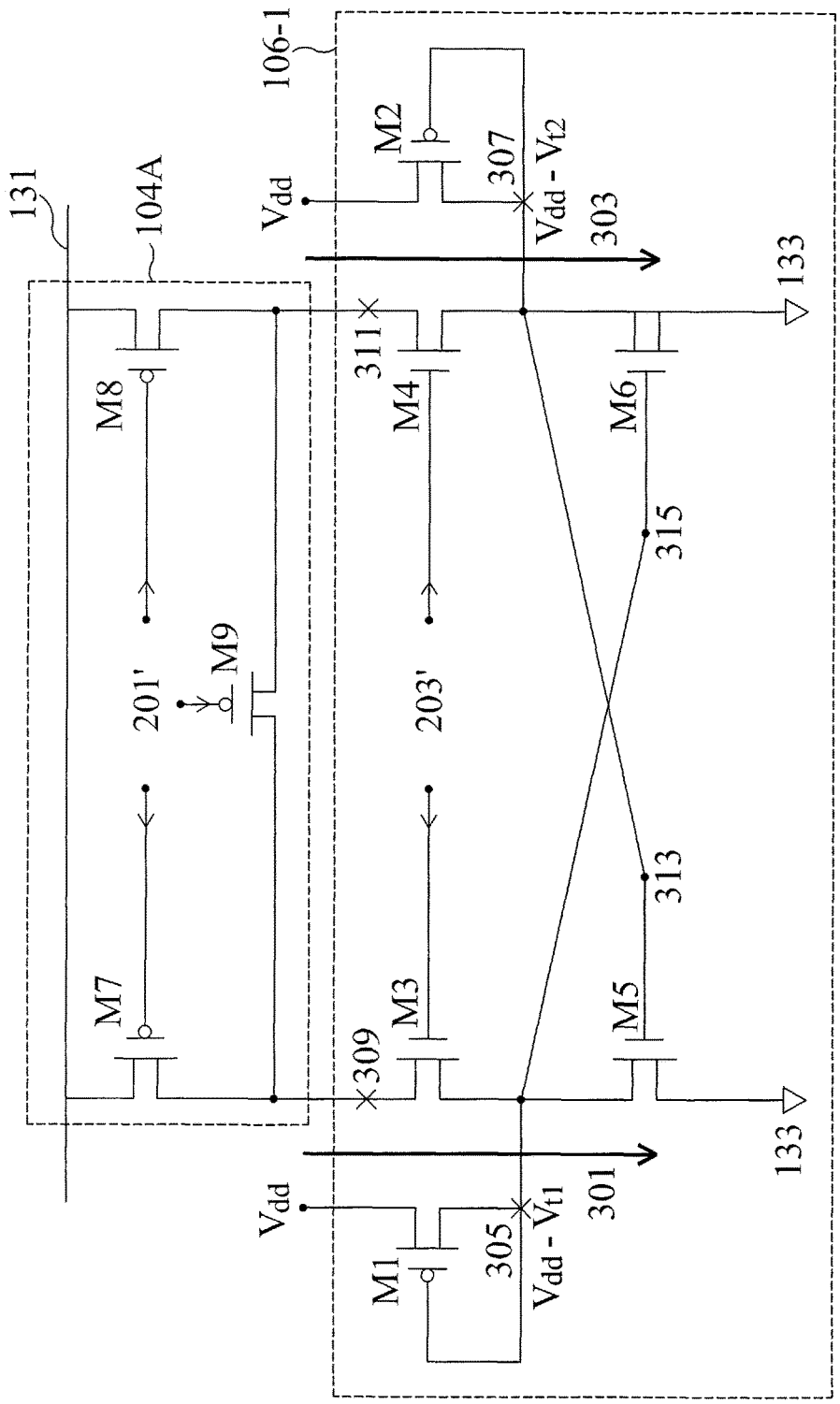
FIG. 3A illustrates an equivalent circuit diagram of a pre-charge unit and a memory bit of the SRAM block of FIG. 2A when the erasion circuit of FIG. 2B performs an erasion process, in accordance with some embodiments.
Figure 3B:
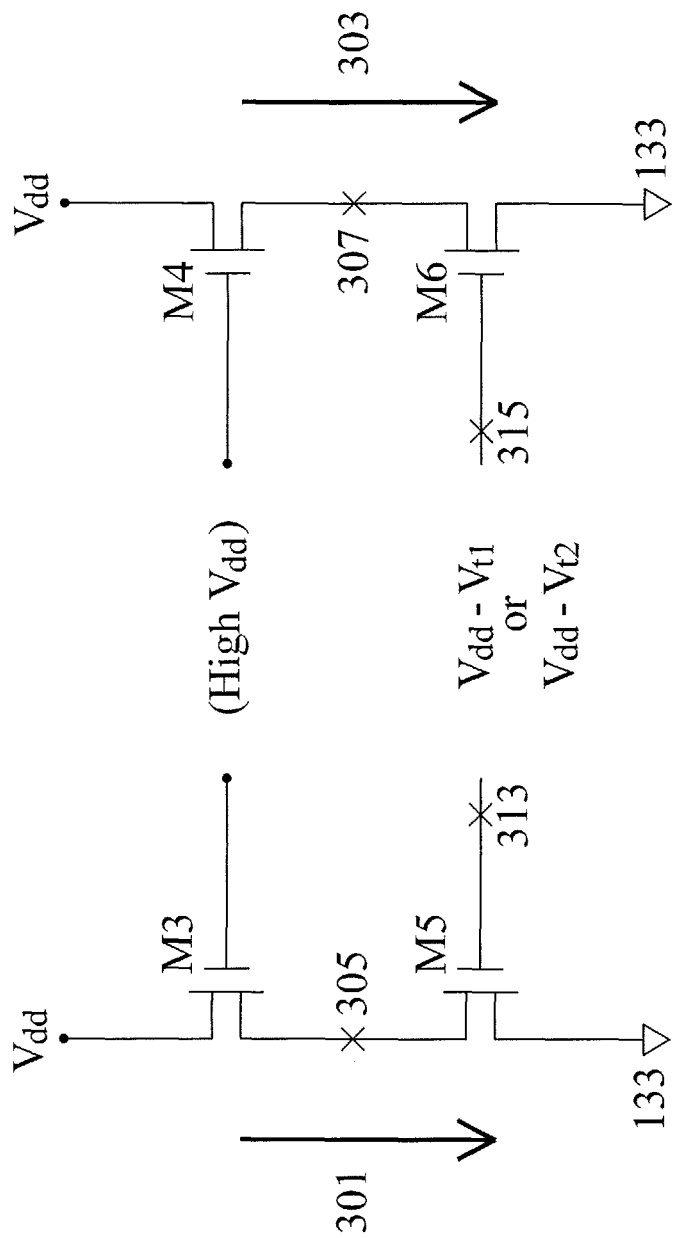
FIG. 3B illustrates a further simplified circuit diagram of the equivalent circuit diagram of FIG. 3A, in accordance with some embodiments.

FIG. 3A illustrates an equivalent circuit diagram of the SRAM bit 106-1 when an erasion process is performed by the erasion circuit 110, and FIG. 3B illustrates an equivalent circuit diagram that is further simplified from the equivalent circuit diagram of FIG. 3A. FIGS. 3A and 3B illustrate high currents 301 and 303 when the SRAM bit 106-1 operates under such a condition. In some embodiments, as shown in FIG. 3A, the blown pre-charge signal 201' at a low state is applied to the gates of transistors M7, M8, and M9 of the pre-charge unit 104A, and the blown WL signal 203' with a voltage level at High Vdd is applied to the gates of access transistors M3 and M4, respectively. Accordingly, the access transistors M3 and M4 are turned on. More specifically, drains of the access transistors M3 and M4 (nodes 309 and 311) are coupled to Vdd (131) through transistors M7 and M8, respectively, and sources of the access transistors M3 and M4 (nodes 305 and 307) are each at a voltage level of, Vdd-Vt1 and Vdd-Vt2, respectively, wherein Vt1 represents a threshold voltage of the pull-up transistor M1 and Vt2 represents a threshold voltage of the pull-up transistor M2. In some embodiments, a gate of the pull-down transistor M5 (node 313) is coupled to the source of the access transistor M4 (node 307) and a gate of the pull-down transistor M6 (node 315) is coupled to the source of the access transistor M3 (node 305). Equivalently, a simplified circuit diagram that illustrates the access transistors M3 and M4 and the pull-down transistors M5 and M6 is shown in FIG. 3B. As shown, since the voltage levels at the drain (node 305) and gate (node 313) of the pull-down transistor M5 are equal, i.e., Vdd-Vt1, and similarly, the voltage levels at the drain (node 307) and gate (node 315) of the pull-down transistor M6 are equal, i.e., Vdd-Vt2, the pull-down transistors M5 and M6 respectively operate at a diode mode. Under such a diode mode, the pull-down transistors M5 and M6 allow a saturation current, 301 and 303, to flow therethrough, respectively. Consequently, saturation currents 301 and 303 flow through transistors M3 and M5 and through transistors M4 and M6, respectively, as illustrated in FIGS. 3A and 3B. In general, a saturation current (e.g., 301 and 303) of a transistor is a substantially high current. Such a saturation (high) current that continuously flows through the transistor may heat up the transistor and thus induce one or more degradation effects such as, for example, a hot carrier (e.g., hot electrons) effect, a bias temperature instability (BTI) effect, etc. As such, one or more intrinsic characteristics of each of the transistors M3, M4, M6, and M6 such as, for example, a threshold voltage may be altered. Once such intrinsic characteristic(s) of a transistor of a SRAM bit (e.g., 106-1, 106-2, 106-3, 106-4, etc.) are altered, the initial state of the SRAM bit may change as well. Thus, the PUF signature generated based on the pre-altered intrinsic characteristic(s) is no longer available.

FIG. 4 illustrates a flow chart of a method 400 to alter a PUF signature generated based on initial states of the bits by using an erasion process, in accordance with various embodiments. In various embodiments, the operations of method 400 are performed by the respective components illustrated in FIGS. 1-3B. For purposes of discussion, the following embodiment of the method 400 will be described in conjunction with FIGS. 1-3B. The illustrated embodiment of the method 400 is merely an example. Therefore, it should be understood that any of a variety of operations may be omitted, re-sequenced, and/or added while remaining within the scope of the present disclosure.

The method 400 starts at operation 402 in which the memory bit array 106 is powered on, in accordance with various embodiments. Once the memory bit array 106 is powered on, each SRAM bit (e.g., 106-1, 106-2, 106-3, 106-4, etc.) of the memory bit array 106 presents a respective initial state, i.e., either a logical 1 or 0. As described above, whether the initial state is a logical 1 or a logical 0 is based on one or more intrinsic characteristics of the transistors that constitute the SRAM bit.

The method 400 continues to operation 404 in which the tampering sensor 114, coupled to the memory bit array 106, detects whether a tampering action exists, in accordance with various embodiments.

If the tampering sensor 114 determines that no tampering action is detected, the method 400 continues to operation 406 in which the I/O circuit 116 of the SRAM block 102 reads out the initial states of the SRAM bits. More specifically, in operation 406, the control logic 112 provides the pre-charge control signal 211 to activate the pre-charge circuit 104 so as to pre-charge the BL's (e.g., 152, 156, etc.) and BBL's (e.g., 154, 158, etc.) of the memory bit array 106, and further provides the WL control signal 213 to assert the WL's one by one (i.e., asserting one WL per time), for example, WL 160, so as to activate the access transistors (e.g., M3 and M4) coupled to the asserted WL. As such, the initial states stored at each SRAM bit along that WL (column) may be respectively read out by the I/O circuit 116. In some embodiments, the control logic 112 may provide an updated WL control signal to assert another WL to allow the initial states stored at the SRAM bits along the another WL to be read out by the I/O circuit 116. After all or at least part of the initial states of the SRAM bits across the memory bit array 106 are read out by the I/OI circuit 116, the method 400 then continues to operation 408 in which the authentication circuit 108 uses the read initial states of the SRAM bits to generate a PUF signature.

On the other hand, back to the operation 404, if the tampering sensor 114 determines that a tampering action is detected, the method 400 continues to operation 410 in which the blown pre-charge signal 201' and the blown WL signal 203' are provided by the sub-circuit 220 and the sub-circuit 270 of the erasion circuit 110, respectively. In some embodiments, the blown pre-charge signal 201' assures the transistors M7, M8, and M9 are turned on, and the blown WL signal 203' causes the access transistors M3 and M4 to be turned on by the High Vdd. Similar to the operation 406, once the transistors M7, M8, and M9 of the pre-charge unit 104A are turned on, the BL's and BBL's of the memory bit array 106 are pre-charged to the Vdd. In some embodiments, the High Vdd is substantially higher than Vdd. More specifically, the High Vdd is applied to each of the gates of the access transistors M3 and M4. Thus, in accordance with various embodiments of the present disclosure, the method 400 continues to operation 412 in which the high currents 301 and 303 (FIGS. 3A and 3B) flow through the SRAM bit 106-1. More specifically, the high currents 301 and 303 (FIGS. 3A and 3B) flow through M3 and M5, and through M4 and M6, respectively. After such high currents flow through the SRAM bit 106-1, the method 400 continues to operation 414 in which the intrinsic characteristic(s) of the transistors of the SRAM bit 106-1 are altered. In some embodiments, the altered intrinsic characteristics may include the threshold voltage(s) of the transistors, as described above. More specifically, the threshold voltage may be altered due to the hot carrier effect and/or the bias temperature instability (BTI) effect induced by (continuously) flowing the high currents through the transistors. Accordingly, the initial state stored/present in the SRAM bit 106-1 (i.e., operation 402) is no longer available. In turn, the PUF signature generated at operation 408 is altered (in response to a detected tampering action).

In some embodiments, while the High Vdd is applied to each of the gates of the access transistors M3 and M4 at operation 410, the High Vdd is also applied to all the gates of the access transistors along row a. That is, following the above-described operations (410 to 412 to 414), all the initial states of the SRAM bits along row a are no longer available.

In an embodiment, a memory device is disclosed. The memory device includes a memory bit array comprising a plurality of memory bits, wherein each memory bit is configured to present an initial logic state when the memory device is powered on, and an erasion circuit, coupled to the memory bit array, and configured to alter an intrinsic characteristic of at least one of the memory bits so as to alter the initial logic state of the at least one memory bit.

In another embodiment, a memory device includes a memory bit array comprising a plurality of memory bits, wherein each memory bit is configured to present an initial logic state when the memory device is powered on; a tampering sensor, coupled to the memory bit array, and configured to detect whether a tampering action is performed on the memory bit array; and an erasion circuit, coupled to the memory bit array and the tampering sensor, and configured to alter an intrinsic characteristic of at least one of the memory bits so as to alter the initial logic state of the at least one memory bit in response to a detected tampering action.

Yet in another embodiment, a method includes powering on a memory array of a memory device that comprises a plurality of memory bits to cause each memory bit to present an initial logic state; determining whether a tampering action exists; in response to a presence of a tampering action, providing a high voltage to at least one memory bit so as to alter an intrinsic characteristic of the at least one memory bit, wherein the altered intrinsic characteristic erases the initial logic state of the at least one memory bit.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
a memory bit array comprising a plurality of memory bits, wherein each memory bit is configured to present an initial logic state when the memory device is powered on, wherein the initial logic states of the plurality of memory bits provide a physically unclonable function (PUF) signature of the memory device; and
a circuit, coupled to the memory bit array, and configured to provide a signal to at least one memory bit of the memory bit array to alter an intrinsic characteristic of the at least one memory bit so as to alter the initial logic state of the at least one memory bit, thereby altering the PUF signature, wherein the intrinsic characteristic includes a threshold voltage of a transistor included in the at least one memory bit.

2. The memory device of claim 1, further comprising:
a tampering sensor that is coupled to the memory bit array and the circuit, and configured to detect whether a tampering action is performed on the memory bit array.

3. The memory device of claim 2, wherein the circuit is configured to alter an intrinsic characteristic of the at least one memory bit in response to a detected tampering action.

4. The memory device of claim 2, wherein the circuit comprises a plurality of pairs of a first sub-circuit and a second sub-circuit, and each pair of the first and second sub-circuits is coupled to a respective row of the memory bit array.

5. The memory device of claim 4, wherein the first sub-circuit is configured to assure the memory bits along the respective row to be either pre-charged or pre-discharged, and the second-sub circuit is configured to provide a voltage to the memory bits along the respective row to cause a current to flow through each of the bits along the respective row, wherein the current causes a hot carrier effect, a bias instability effect, or a combination thereof on at least one memory bit along the respective row.

6. The memory device of claim 5, wherein the voltage has a voltage level that exceeds that of a supplied voltage of the memory bits.

7. The memory device of claim 1, further comprising:
an authentication circuit coupled to the memory bit array, and configured to generate the physically unclonable function (PUF) signature for the memory device based on the initial logic states of the memory bits.

8. The memory device of claim 1, further comprising:
a plurality of pre-charge units each coupled to a respective column of the memory bit array and configured to either pre-charge or pre-discharge memory bits along the respective column.

9. A memory device, comprising:
a memory bit array comprising a plurality of memory bits, wherein each memory bit is configured to present an initial logic state when the memory device is powered on, wherein the initial logic states of the plurality of memory bits provide a physically unclonable function (PUF) signature of the memory device;
a tampering sensor, coupled to the memory bit array, and configured to detect whether a tampering action is performed on the memory bit array; and
a circuit, coupled to the memory bit array and the tampering sensor, and configured to provide a signal to at least one memory bit of the memory bit array to alter an intrinsic characteristic of the at least one memory bit so as to alter the initial logic state of the at least one memory bit in response to a detected tampering action, thereby altering the PUF signature, wherein the intrinsic characteristic includes a threshold voltage of a transistor that constitutes the at least one memory bit.

10. The memory device of claim 9, further comprising:
an authentication circuit, coupled to the memory bit array, and configured to generate the PUF signature for the memory device based on the altered initial logic state of the at least one memory bit.

11. The memory device of claim 9, further comprising:
a pre-charge unit that is coupled to the at least one memory bit and configured to either pre-charge or pre-discharge the at least one memory bit.

12. The memory device of claim 11, wherein the circuit comprises a first sub-circuit and a second sub-circuit that are coupled to the pre-charge unit and the at least one memory bit, respectively.

13. The memory device of claim 12, wherein the first sub-circuit is configured to assure the at least one memory bit to be either pre-charged or pre-discharged, and the second-sub circuit is configured to provide a voltage to the memory bits along the respective row to cause a current to flow through each of the bits along the respective row, wherein the current causes a hot carrier effect, a bias instability effect, or a combination thereof on at least one memory bit along the respective row.

14. The memory device of claim 13, wherein the voltage has a voltage level that exceeds that of a supplied voltage of the at least one memory bit.

15. The memory device of claim 9, further comprising:
an authentication circuit coupled to the memory bit array, and configured to generate the physically unclonable function (PUF) signature for the memory device based on the initial logic states of the memory bits.

16. A method, comprising:
powering on a memory array of a memory device that comprises a plurality of memory bits to cause each memory bit to present an initial logic state, wherein the initial logic states of the plurality of memory bits provide a physically unclonable function (PUF) signature of the memory device;
determining whether a tampering action on the memory device is detected;
in response to detection of the tampering action, providing a signal to at least one memory bit to alter an intrinsic characteristic of the at least one memory bit, wherein the altered intrinsic characteristic erases the initial logic state of the at least one memory bit, thereby altering the PUF signature, wherein the intrinsic characteristic includes a threshold voltage of a transistor that constitutes the at least one memory bit.

17. The method of claim 16, further comprising:
  in response to an absence of a tampering action, generating a physically unclonable function (PUF) signature for the memory device based on the initial logic states of the memory bits.

* * * * *